Patented Mar. 10, 1931

1,795,528

UNITED STATES PATENT OFFICE

HENRY COWAN WATSON AND MARTIN WADDELL, OF BELFAST, IRELAND, ASSIGNORS TO WATSON-WADDELL LIMITED, OF BELFAST, IRELAND, A COMPANY OF NORTHERN IRELAND

PROCESS OF PRODUCING FIBER AND YARN FROM UNRETTED FLAX PLANTS

No Drawing. Application filed July 11, 1928, Serial No. 292,019, and in Great Britain July 29, 1927.

This invention relates to the treatment of flax without first retting for the production of fiber therefrom.

The object of the invention is to produce a greater percentage of fibers from the flax stalks and a greater percentage of yarn from a given quantity of flax straw.

According to the invention the rove before further treatment is wound on to an open reel and the subsequent retting by bacteria or chemical action is carried out on the reel which allows a free circulation of the liquor through the rove from every side.

We take the unretted flax from the field either as it is pulled or cut and (a) subject it to heat until the gummy matter has become hard and the woody stalk and seed balls dry and brittle and ready to separate from the fibers and so as to prevent "licking up" (b) divide the flax straw into separate pieces (before or after drying) and put a lap or tie upon each convenient for screwing into a holder to facilitate subsequent operations (c) treat the dried brittle flax stalks mechanically to simultaneously break or crush the woody stalk and the seed balls to facilitate the parting of the stalk from the fiber, and to separate and recover the seed, (d) scutch, hackle or card the fibers to remove the woody shive therefrom, (e) reduce the fibers to a sliver and twist into a tight rope or rove (f) wind the twisted rove on to an open reel, (g) ret the twisted rope or rove on the reel by bacteria or chemicals to soften the gummy matter, (h) wash in a solution to remove and wash away impurities, (i) and finally spin the rope or rove into yarn, from the open reel without rewinding, either by the dry or wet method of spinning.

In carrying out the invention the flax is cut or harvested or pulled while the seed is ripening and bundled into sheaves and in its unretted state the sheaves with the seed adhering are heat treated in a drying chamber (heated by steam, hot water or direct heat or hot air) until the gum and gummy matter contained in the fiber has become hard and the woody stalk and the seed balls dry and brittle in a condition to be separable from the fibers. The heating so dries and hardens the gummy matter so as to prevent "licking up" or lapping upon the rollers in subsequent operations.

The flax before or after drying and hardening and before scutching is divided into separate pieces and a lap put on each piece to keep the pieces separate to be screwed into a holder and to facilitate subsequent handling, thus saving further piecing out or dividing before putting into hackling machine or on to a spread-board or in the spinning mill.

The dried and hardened straw after removal from the heating chamber is preferably screwed into a holder (or it may be hardened in separate pieces) and is mechanically treated by being passed between a series of fluted rollers to break or crack the woody material and simultaneously burst the seed balls and dislodge the seed.

The seed falls between the rollers and is collected by a conveyor or otherwise in the bottom of the machine and subsequently by winnowing separated from dust and shive as a marketable asset.

From the breaking rollers the flax may be rubbed between slotted moving blades to soften and separate the shive or taken to any known construction of scutching and/or hackling machine or breaker card to remove the woody material and shive from the fibers. Where a card is employed the card is set and driven in such a manner that as little of the fiber will be lost as possible.

The flax after separation of the seeds and woody shives is carded and is treated mechanically in a spread-board, gill frame or roving frame and reduced to a sliver and tightly twisted into rope or coarse rove, leaving all the gum and impurities in the fiber.

This twisted rove is wound on to a small open reel (with or without ends) which is preferably slipped over the bobbin on the roving frame (the head of the bobbin having been removed), or it may be placed on the bare roving spindle the fibers being held together by the twist during the subsequent treatment. The twisted rove while on the reel is retted bacteriologically and/or in a chemical solution and bleaching solution (such as soda ash) to wash away and remove the gum and impurities therefrom.

The reel must be quite open like a hank reel to permit the retting liquor to penetrate and circulate freely through the twisted rove thereon.

The rove must be twisted much tighter than the usual standard of rove. This is important as rove treated with usual standard twist would fall asunder during the retting and could not be spun, but be a mass of pulped fiber.

The tightly twisted rove on the reel after retting and washing may be placed direct in the creel of a spinning frame or it may be put over drawing frames or roving frames and further drawn out into pure rove and rewound on to bobbins for the creel of a spinning frame and spun wet in a flax spinning frame into any lea desired.

The above method can be described as drying, hardening, scutching, hackling, spreading or carding unretted fiber in a manner calculated to obtain the most fiber, making same into heavy gill spun rove, retting by bacteria or ferment in rove or rope form on an open reel and afterwards treating this rove in bleach or chemical liquor until pure and then spinning this heavy gill spun treated rove to finer leas in a spinning frame.

The following is an example of the treatment to which the fiber, after it has been formed in the unretted state into rope or rove on an open reel, is subjected.

The unretted rove on the open reels is placed in a degumming tank and boiled for three hours with 2% of soda ash and after this boiling cold water is turned on and kept running for upwards of half an hour to wash away the soda ash and impurities contained in the rove. The rove is then removed directly to the spinning frame and spun by the wet process, cold water being used in the trough instead of hot.

The process may be carried out more or less continuously in the same factory or the preliminary processes of drying and hardening and extracting the seed and fiber from the unretted flax plant may be performed at a scutch mill, and the produce removed to the spinning mill to receive the second mechanical treatment of hackling or carding and twisting into a rope or rove and winding on to a reel, and the wound reels removed therefrom to a bleach works for retting by bacteria and subsequent chemical boiling and bleaching treatment and returned to the spinning mill for final spinning into yarn.

Unretted fiber, or sliver, of line and tow, or line or carded flax, can be blended together, or blended with retted fiber, and spun as described before, or in the ordinary manner.

We consider that this process effects a great saving in production the grassy nature of unretted flax prevents the fiber from napping or running into knots or loops, and more especially so after being dried and hardened by heat, hence line-yarns can be spun from scutched flax without the cost and waste of hackling, thereby making a cheaper line-yarn than produced heretofore as we consider we obtain a greatly increased percentage of both fiber and yarn.

What we claim as our invention and desire to protect by Letters Patent is:—

1. In the process of obtaining fiber and yarn from unretted flax straw breaking, scutching, and twisting the fibers into a rove and subsequently winding the rove on to an open reel in the roving frame, retting the rove while on the reel, washing to remove impurities and spinning the retted rove from the reel substantially as described.

2. The process of producing or obtaining fiber and yarn from unretted flax straw by subjecting the stalks to a high temperature to dry and harden the gummy constitutents and render the woody parts and seed balls brittle, mechanically treating the stalks to simultaneously remove the shives and seeds, twisting the fiber into a hard tightly twisted rove and retting on an open reel by bacteria in rope form and finally spinning into yarn.

3. The process for producing or obtaining fiber and yarn from unretted flax which consists in drying the flax stalks to harden the gummy constituents and render the woody stalk and seed balls dry and brittle and ready to separate from the fiber, dividing the flax straw into separate pieces convenient for handling, tying the piece with a lap for screwing the piece into a holder, treating the dried and hardened flax stalks mechanically, and simultaneously breaking and crushing the woody part and the seed balls to remove the former and separate and recover the seed, scutching, hackling and carding, reducing the fibers and twisting them into a tightly twisted rove, winding the rove on to an open reel, retting by bacteria to soften and dissolve the gummy matter while the fibres are on the real and are firmly held together by the twist and subsequently treating in solutions to remove and wash away impurities and finally spinning the retted rove substantially as described.

In testimony whereof we have hereunto set our hands.

HENRY COWAN WATSON.
MARTIN WADDELL.